Nov. 20, 1928. Re. 17,140

J. M. JONES

METAL WHEEL

Original Filed Nov. 12, 1926 2 Sheets-Sheet 1

Inventor

James M Jones

By Wood & Wood Attorneys

Nov. 20, 1928. Re. 17,140

J. M. JONES

METAL WHEEL

Original Filed Nov. 12, 1926 2 Sheets-Sheet 2

Inventor

James M. Jones

By Wood & Wood Attorneys

Reissued Nov. 20, 1928. Re. 17,140

UNITED STATES PATENT OFFICE.

JAMES M. JONES, OF MANCHESTER, KENTUCKY, ASSIGNOR, BY DIRECT AND MESNE ASSIGNMENTS, OF TWENTY-SEVEN AND ONE-HALF PER CENT TO RALPH A. KENNEDY, OF HAMILTON, OHIO, AND TWELVE AND ONE-HALF PER CENT TO RICHARD C. KENNEDY, OF CINCINNATI, OHIO.

METAL WHEEL.

Original No. 1,642,207, dated September 13, 1927, Serial No. 148,002, filed November 12, 1926. Application for reissue filed March 31, 1928. Serial No. 266,404.

This invention relates to an all-metal wheel, the rim, hub and spoke components of which are welded into a rigid, staunch unit, constituting virtually a one-piece all-steel wheel.

One object of the invention is to provide a wheel of metallic spoke general characteristic as distinguished from the conventional order of so-called "wire wheel" in which each one or at least a considerable number of the wires make a plurality of crossings or intersections with other wires, resulting in a wheel having the effect of wire netting between hub and rim.

Another object of my invention is to produce a staunch wheel the components of which are easily assembled into a simple, spoke, rim, and hub organization, best adapted for welding operations on a manufacturing scale and at the same time requiring a minimum of mechanical skill and technique in constituting the finished article.

Another object of the invention is to provide a disposition and arrangement of metallic spokes relative to one another and to the rim and hub, in which the number of spokes, as well as the respective lengths of spokes, requisite to a wheel of predetermined size and strength shall be reduced to a numercial and lineal minimum, involving also a minimum of spoke intersecting points but withal producing a maximum strength and rigidity per number, length and weight of parts.

Figure 4:
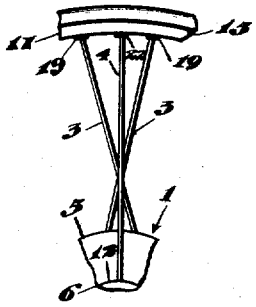

As the first factor of my concept involves the provision of a structure in which the load bearing spokes shall have the fewest possible intersecting points per number of spokes selected and hence being as slightly as possible angled to the radius of the wheel, I have first somewhat theoretically divided the wheel circle roughly into a series of approximate sectors, providing for each sector an individual three-member spoke group, as clearly indicated in Figure 4, illustrating the important factor that no member of this (or each) group intersects with a member of any other group.

Each spoke group therefore is separate and distinct from the other groups, very much as if the sectors were originally metal web-like spokes cut away or skeletonized into the three-spoke members or truss organized as to relative position and disposition in a particular manner hereinafter described.

In the drawings, Figures 1, 2, 3 and 4, I have shown the preferred embodiment of my invention as a demountable wheel in which the elongated sleeve hub 1 may be of conventional pattern as also the rim 2 providing a tire holding channel. While it is not of the essence of my invention it is most advantageously embodied in a sleeve hub of the standard type having a relatively large and small end 5, 6 respectively, representing a construction adapting the wheel for application to the front spindles or for application to the rear axles of an automobile. The larger diameter hub end 5 provides an annular flange for spoke attachment as is also the case with the smaller end 6.

Details of the hub structure will be later pointed out.

The individual three-member spoke group of which there is one group, roughly, for each assumed sector of the wheel, comprises the spoke 4 connecting the rim with the smaller hub end 6, disposed in the radial plane of the wheel axis and inclined to the vertical so that the group of these spokes 4, lie in the surface of a cone and constitute virtually brace rods in this radial plane. Associated with each of these relatively long bracing rods or radial spokes 4 is a pair of shorter spokes 3 which intersect in the radial plane of the spoke 4 at a point preferably near the hub and which short spokes connect the larger hub end 5 with the rim.

It will be understood of course that the opposite ends of these spokes respectively are welded into the metal of the rim and of the hub flanges 5, 6 respectively. By preference, the pairs of crossing spokes 3 are inclined as slightly as possible to the radius forming in practice generally appreciably less than a 90° angle. While these spokes 3 are shown as being in a vertical plane this is not absolutely essential, but, in practice, it is the crossing pairs of spokes 3 that are virtually short, load-bearing spokes, each pair of which is solidly braced and trussed by the radius rod 4 lying in the surface of the cone and in a plane which preferably bisects the angle of intersection of the crossed pairs of spokes 3.

By individual groups of three-member spokes it will be understood that I am distinguishing from group arrangements of spokes in which the members of a given or each group intersect with one or more of the members of the adjacent groups.

It will thus be seen that my wheel is unique in that it may be assumed to be built up by circumferentially assembling a series of independent sector spoke units, Figure 4, each in and of itself being a complete three-member spoke body comprising a rim and a hub segment united by the crossing pair of short spokes and braced by the long radial spokes which collectively lie in the surface of a cone.

The rim ends of the paired spokes are more widely spaced than the hub ends, which is of advantage in the welding operations and enabling the relative uniform spacing of the spokes around the hub flanges and along the rim.

Furthermore, the single crossing of each pair of short spokes avoids the necessity of twisting wires to pass each other or of materially offsetting them longitudinally of the hub flanges.

There is but limited circumferential space or surface for spoke attachment provided by the hub flanges, and my system of arranging these three-member groups provides room and material for convenient and solid spoke attachment, without unduly crowding or congesting the spokes in relation to the perihpery of the hub flanges.

As previously indicated, it is one of the objects of my invention to provide as stout a wheel as possible and also to provide a structure enabling the use of spokes of relatively short lengths.

As contributory to these objectives I have provided and prefer a special rim structure, the channel for the tire being defined by the rolled up or beaded edges 15 and the medial portion of the rim channel being formed with the inward depression 16 providing a hollow annular rib 17 on the inner side of the rim for spoke attachment. The length of spokes required is of course shortened to an extent corresponding to the dimension of the depression and this medial annular hollow rib enables the outer ends of the two sets of spokes respectively to be brought into approximate alignment in relation to the medial portion of the rim. By this arrangement not only is the welding operation materially simplified, but the rim is reinforced in cross section. The hollow rib medial of the channel is helpful in removing a tire from the rim and provides as well, a medial annular air chamber under the tire body when seated on the rim.

Having thus defined the main and outstanding features of the invention, I will proceed to describe other details and refinements representing my preferred construction and providing a concrete example for building one practical embodiment of the invention.

The spokes are formed with enlarged ends terminating in pins or protuberances, butt-welded and upset or headed into the rim and hub, tension being applied to secure the parts together in a taut or clamped relationship. Specifically, the spokes 3, 4 are shown as having enlarged ends 19 with pins 20 passing through apertures 11 in the bottom wall of the groove 10, and through apertures 18 in the rib 17, the pins or protuberances being upset to form the clamping heads 21.

The spokes 4, likewise, have enlarged ends 22 in the hub groove 13, said ends terminating in pins or protuberances 23 passing through the apertures 14 and 24, the ends of the pins or protuberances being upset to provide clamping heads 25.

Figure 1:
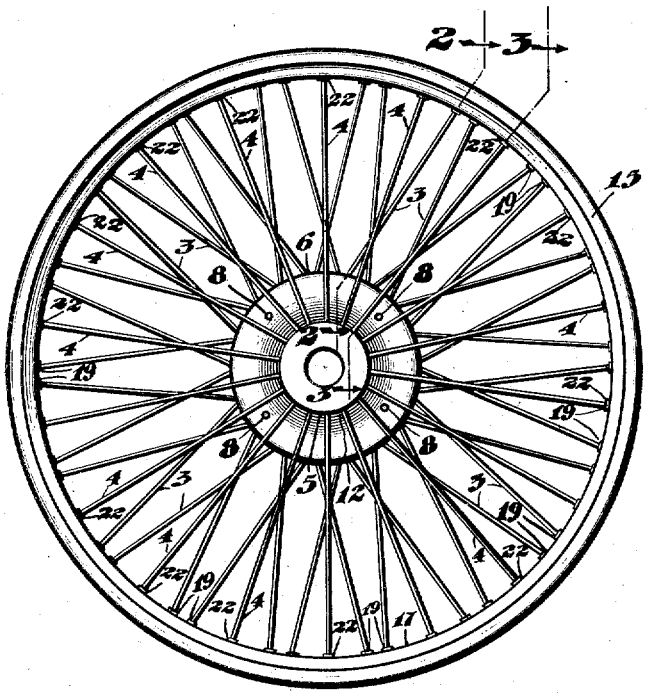
Figure 5:
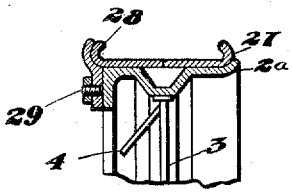
Figure 2:
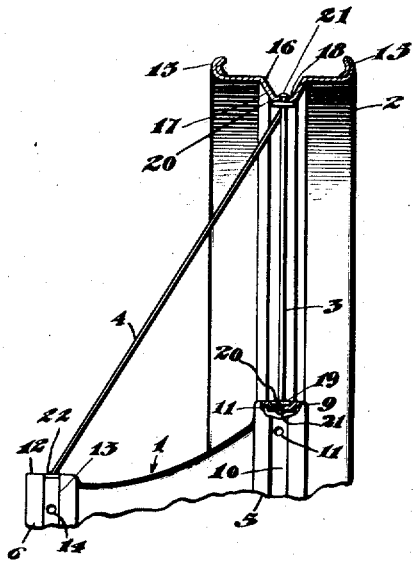
Figure 3:
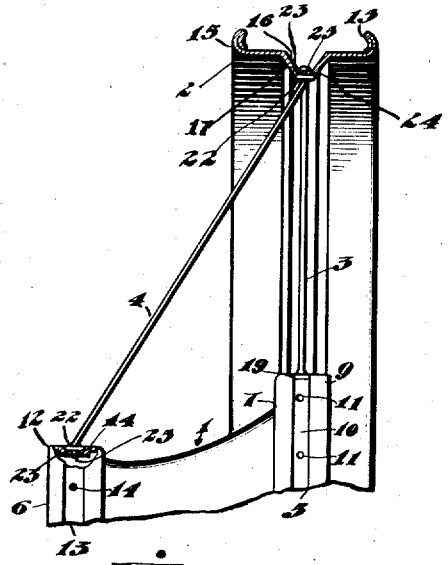

Figure 5 illustrates a demountable rim modification wherein rim $2^a$ is formed with a fixed flange 27 and a removable flange 28 held in place by the member 29.

Many of these details, it will be understood, are not essential to the invention which is capable of many variations and which admits of the application of many different varieties of welding apparatus or process.

None of the metallic spokes are attached to the rim or hub flange at any considerable angle to the radius, thus providing good abutment contact and permitting a strong butt weld union.

It should be understood that the drawings are merely illustrative and do not attempt to give exact proportions or dimensions. Furthermore, the said drawings are illustrative of a preferred construction, it being my expectation that various changes and modifications may be made without departing from the spirit and scope of my invention. Also it will be understood that these drawings make no effort to provide scaling, but that by preference I select spokes which are metallic rods rather than thin wires, and it is necessary to do this in order to have a body of metal in the spoke adaptable to welding operations and to provide sufficient metal to be upset into the metal of the rims and hub flanges in a manner well understood by the art.

Having described my invention, I claim:

1. A metal wheel comprising a hub provided with enlarged inner and outer ends, the inner hub end being larger than the outer end thereof, a rim, spokes extending from the inner end of the hub to the rim and being arranged in pairs and the spokes of each pair arranged in crossed relation, and spokes connected to the outer hub end and rim, there being one of the outer spokes for each pair of inner spokes and each outer spoke being arranged in a plane bisecting the angle of crossing of each pair of inner spokes.

2. A metal wheel comprising a hub, a rim, and spokes provided with enlarged ends welded to one of said parts and provided at said ends with protuberances engaging and welded to such part.

3. A metal wheel having a hub provided with a groove, the bottom wall of the groove being provided with openings, and spokes having their inner ends secured in the openings and provided at said ends with enlarged portions fitting in the groove.

4. A metal wheel having a hub provided with a groove, the groove being provided in the bottom wall thereof with openings, and spokes having their inner ends positioned in said openings and provided at said ends with enlarged portions fitting in the grooves, and said ends and their enlarged portions being welded to the hub.

5. A metal wheel comprising a hub, a rim, one of said parts being provided with openings, and spokes having enlarged ends contacting with the part having the openings and provided with protuberances passing through the openings, the enlarged ends and protuberances being welded to said part and the protuberances being upset to provide heads between which and the enlarged ends said part is clamped.

6. A metal wheel comprising a hub provided at the inner and outer ends thereof with grooves, the bottom walls of the grooves being provided with openings, and spokes having enlarged ends and provided at said ends with pins, the enlarged ends fitting in the grooves and the pins passing through the openings, and the pins being upset to provide heads between which and the enlarged ends the hub is clamped.

7. A metal wheel comprising a rim provided at its inner side with an annular hollow rib, and spokes having enlarged ends contacting with the inner side of the rib, the spokes being provided at said ends with protuberances passing into the rib, and the protuberances being upset to provide heads.

8. An all metal wheel comprising a rim and elongated sleeve hub, metallic spokes welded into the rim and hub ends and serially disposed in individual three-member groups, one of said members being arranged in a radial plane and the other two members being disposed in pairs intersecting in said radial plane.

9. An all metal wheel comprising a rim and elongated sleeve hub, metallic spokes welded into the rim and hub ends and serially disposed in individual three-member groups, one of said members being arranged in a radial plane and the other two members being disposed in pairs intersecting in said radial plane, the said radial members lying in the surface of a cone.

10. An all metal wheel comprising a rim and elongated sleeve hub, metallic spokes welded into the rim and hub ends and serially disposed in individual three-member groups, one of said members being arranged in a radial plane and the other two members being disposed in pairs intersecting in said radial plane, the said radial members lying in the surface of a cone, the intersection point of the paired members being relatively near the hub.

11. An all metal wheel comprising a rim and an elongated sleeve hub formed with a relatively large and small diameter annular flange, metallic spokes welded to said flanges and rim and serially disposed in individual three-member groups, each group comprising a member extending in a radial plane from the rim to the smaller hub flange, and a pair of shorter members intersecting in said radial plane and extending from the rib to said larger hub flange.

12. An all metal wheel comprising a rim, an elongated sleeve hub and a circumferential series of individual three-member spoke groups, each group comprising a radial brace rod and a pair of spokes crossing in the radial plane of said rod, the opposite ends of said rods and spokes being upset in the metal of the hub and rim ends respectively, providing tension securance of the rim in relation to the hub.

In witness whereof, I hereunto subscribe my name.

JAMES M. JONES.